Dec. 11, 1923.
F. HACHMANN
DETACHABLE HINGE
Filed Feb. 21, 1921    2 Sheets-Sheet 1
1,476,966
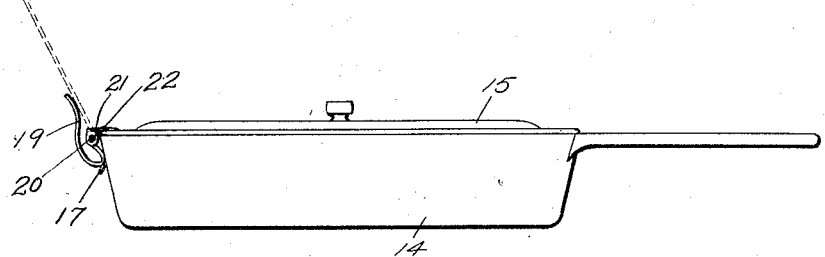
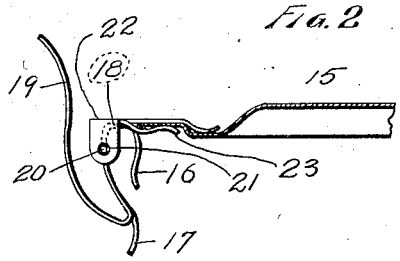
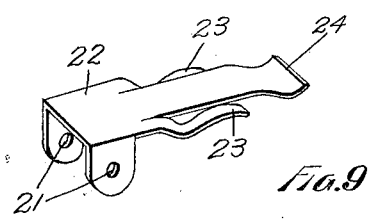
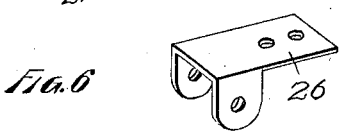
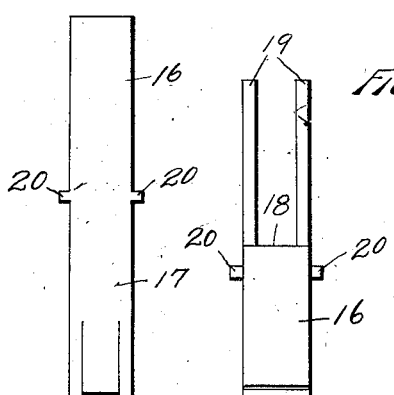
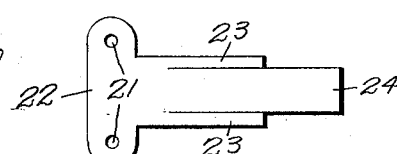
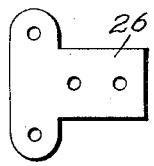
INVENTOR
FREDERICK HACHMANN
BY Edward E. Longan
ATTY.

Dec. 11, 1923.　　　　　　　　　　　　　　　1,476,966
F. HACHMANN
DETACHABLE HINGE
Filed Feb. 21, 1921　　　　2 Sheets-Sheet 2
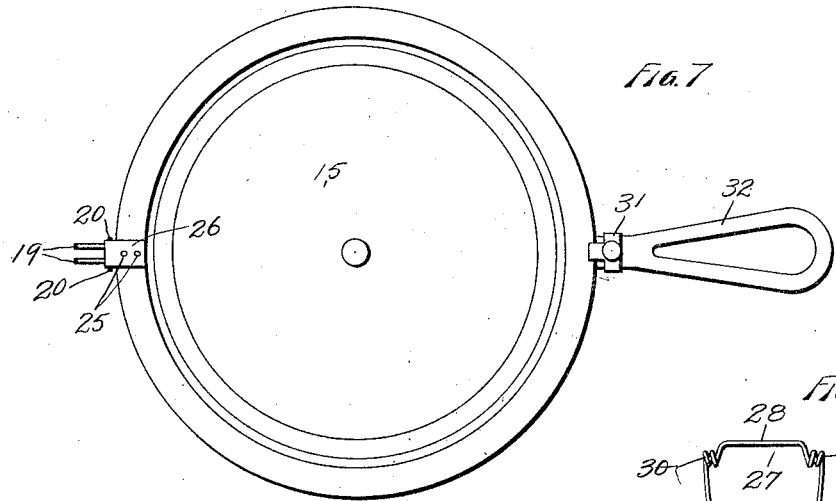
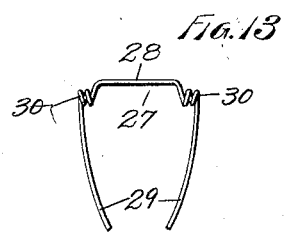
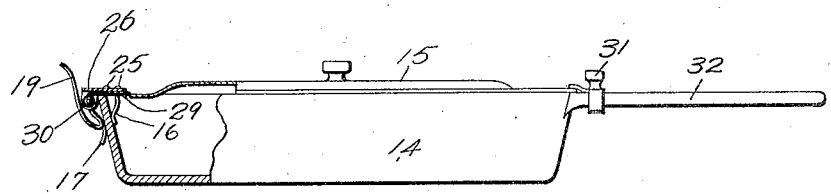
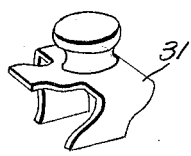
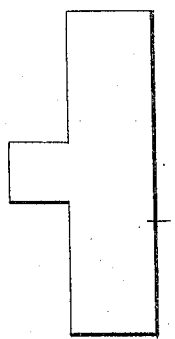
INVENTOR
FREDERICK HACHMANN
BY Edward C. Loregan
ATTY Patented Dec. 11, 1923.

1,476,966

UNITED STATES PATENT OFFICE.

FREDERICK HACHMANN, OF ST. LOUIS, MISSOURI, ASSIGNOR TO WILLIAM H. GREGG, OF ST. LOUIS, MISSOURI.

DETACHABLE HINGE.

Application filed February 21, 1921. Serial No. 446,889.

*To all whom it may concern:*

Be it known that I, FREDERICK HACHMANN, a citizen of the United States, and resident of the city of St. Louis, and State of Missouri, have invented certain new and useful Improvements in Detachable Hinges, of which the following is a specification, containing a full, clear, and exact description, reference being had to the accompanying drawings, forming a part hereof.

My invention relates to improvements in removable hinge covers, and has for its primary object the construction of a removable hinge cover for kitchen utensils, such as skillets and pans of various forms and sizes, whereby the cover may be readily removed and applied and the cover opened and closed without entirely removing it from the utensil.

In the drawings:

Fig. 1 is a side elevation of a skillet having my improvement applied thereto;

Fig. 2 is a side elevation of my improvement, the lid or cover being partly in section and broken away;

Fig. 3 is a perspective view of one of the parts of my improvement which is detachably connected to the cover or lid;

Fig. 4 is a front elevation of my improvement;

Fig. 5 is a plan view of one of the parts of my improvement stamped out of sheet metal and before being formed;

Fig. 6 is a plan view of another part of my improvement when stamped and before being bent into form;

Fig. 7 is a top plan view of a skillet having applied thereto a modified form of my invention;

Fig. 8 is a side view of a modified form of my improvement, with parts broken away and in section;

Fig. 9 is a perspective view of a modified form of my improvement wherein it is permanently attached to the lid;

Fig. 10 is a plan view of said part before being formed;

Fig. 11 is a perspective view of the clip employed in the modified form of my invention for holding the lid closed;

Fig. 12 is a plan view of the clip before being formed; and

Fig. 13 is a plan view of the spring which I employ in the modified form of my improvement.

Referring to the drawings:

14 indicates an ordinary skillet and 15 the lid therefor. My improved device consists of a spring clamping device which may be applied over the edge of the utensil, and consists of a spring arm 16 which is adapted to yieldingly contact against the inside surface of the wall of the vessel, and is also provided with a spring arm 17 which is adapted to yieldingly contact with the outside surface of the wall of the vessel, and is provided with a portion 18 adapted to rest on the top edge of the vessel.

Formed integral with the spring arm 17 are up-turned prongs 19 and formed integral with the arm 17 are a pair of trunnions 20. These trunnions are adapted to be inserted in the eyes 21 formed on the member 22 which is attached to the lid or cover 15. The member 22 is provided with spring arms 23, which are adapted to grip the cover on its underneath surface and with the spring arm 24, adapted to grip the cover on its top surface. In this construction my improvement is designed to be detachably connected to the lid or cover.

In Figs. 7, 8, 9, 10, 11, 12 and 13, I have shown a modified form of my improvement. In this construction my improvement is permanently attached to the lid by means of rivets 25 passing through the portion 26 and the lid. In this modified construction, my device forms a permanent attachment to the lid or cover.

In the modified form of my improvement I also employ a spring 27 having a portion 28 and arms 29, and eyelets 30, and insert the trunnions 20 in these eyelets, the portion 28 of the spring resting against the inside surface of the spring arms 17 and the arms 29 resting on each side of the spring clamp between the lid and the top edge of the vessel. In this construction the lid or cover is opened by the spring when the clip 31, mounted on the handle 32, has been disengaged from the lid or cover. In the modified form of my improvement, when the lid is closed there is a tension applied to the spring arms 29 which will tend to open the lid when the clip 31 has been disengaged therefrom.

In the form of my improvement illustrated in Figs. 1, 2, 3, 4, 5 and 6, the lid or cover is opened by hand and thrown back against the up-turned prongs 19, as illustrated in Fig. 1, against which it rests, whereas in the modified form the lid or cover is opened by the spring 17, and in both forms of my device it is not necessary to entirely remove the lid or cover in order to open same.

After either form of my device has been constructed, as described, and it is desired to use the same, I insert the spring clamp of the device over the wall of the utensil and it is adaptable to form a hinge connection between the utensil and the lid or cover.

Having fully described my invention, what I claim is:

1. A removable hinge, comprising a spring clamp formed of two opposing spring arms curved towards each other, an upwardly curved extending projection formed integral with the outer one of said arms, a pair of trunnions formed integral with said clamp, a clamp provided with a pair of perforated ears mounted on said trunnions, said last mentioned clamp having spring arms for engaging the upper and lower surfaces of a lid for detachably connecting said lid to the hinge.

2. A removable hinge, comprising a spring clamp formed of two opposing spring arms curved towards each other, an upwardly curved extending projection formed integral with the outer one of said arms for holding a lid when in open position, a pair of trunnions formed integral with said clamp, a clamp provided with a pair of perforated ears mounted on said trunnions, said last mentioned clamp having spring arms for engaging the upper and lower surfaces of a lid for detachably connecting said lid to the hinge, a spring carried by said hinge for lifting said lid, and means for holding said lid in closed position.

In testimony whereof, I have signed my name to this specification.

FREDERICK HACHMANN.